United States Patent [19]

Murphy

[11] Patent Number: 4,943,181

[45] Date of Patent: Jul. 24, 1990

[54] QUICK DISCONNECT WITH LOCKING FEATURE FOR PICK AND PLACE DEVICES

[75] Inventor: Patrick M. Murphy, Lake Orion, Mich.

[73] Assignee: Mif-Sud Industries, Inc., Sterling Heights, Mich.

[21] Appl. No.: 383,403

[22] Filed: Jul. 20, 1989

[51] Int. Cl.⁵ .................................................. G05G 5/06
[52] U.S. Cl. .................................... 403/324; 403/116; 403/322; 292/143; 292/165
[58] Field of Search ................ 403/1, 322, 324, 326, 403/321, 116; 292/143, 165

[56] References Cited

U.S. PATENT DOCUMENTS

| 3,251,630 | 5/1966 | Astley | 403/1 X |
| 4,101,153 | 7/1978 | Dozier | 292/165 |
| 4,649,769 | 3/1987 | Venable | 403/324 X |
| 4,809,995 | 3/1989 | Ramunas | 403/322 X |

FOREIGN PATENT DOCUMENTS

2397503 3/1979 France ............................. 292/143

Primary Examiner—Andrew V. Kundrat
Assistant Examiner—Franco S. DeLiguori
Attorney, Agent, or Firm—Remy J. VanOphem

[57] ABSTRACT

A quick disconnect device having a locking feature for securing the quick disconnect device in a lock position is provided for connecting tooling attachments to the boom of an electromechanical feeder used with pick and place operations. The locking action utilizes a cam and follower arrangement and is provided by a detent in a lock position of the cam contour. The detent retains the cam follower in the lock position and prevents the cam follower from becoming unintentionally released, preventing the tooling attachment from becoming loose or disconnected from the boom.

9 Claims, 3 Drawing Sheets

QUICK DISCONNECT WITH LOCKING FEATURE FOR PICK AND PLACE DEVICES

Background of the Invention

1. Field of the Invention

The present invention generally relates to a quick disconnect device for electromechanical devices which are used to move parts between two fixed points, such as to load and unload stamping press. More specifically, this invention relates to a quick disconnect device having a detent which secure the quick disconnect device in a lock position when the quick disconnect device has mechanically connected an attachment to the boom of the electromechanical device.

2. Description of the Prior Art

Electromechanical devices, or feeds, are extensively used with stamping presses, automated assembly lines, and other similar pick and place operations. Feeders typically include an electromechanical drive system and one or more attached drive arms. Each arm has one or more booms mounted to its ambulatory end to which tooling attachments can be connected for performing the various pick and place operations. The feeders are required to operate at high speed to ensure efficient operation and with precision to prevent damage to the feeder, the tooling attachments, cooperating equipment, and the products of the operation.

Another requirement of such feeders is the need for interchangability between various tooling attachments. To reduce machine downtime, it is necessary that the changeover between tooling attachments be conducted quickly. Therefore, quick disconnect devices have been developed to quickly connect and disconnect attachments with the boom of a feeder.

A disadvantage of quick disconnect devices known thus far is their susceptibility to becoming disengaged during operation as a result of the vibrations and rapid motions of the feeder arm. An undesirable result is that the tooling attachment becomes loose from the boom. Wear can also occur within the quick disconnect device which can lead to further loosening of the tooling attachment and ultimately the replacement of the quick disconnect device. Further consequences are the loss in accuracy of placement which produces wear of cooperating equipment such as dies and molds, the damage or destruction of the tooling attachment when it becomes overly loose or entirely disconnected, and the accompanying downtime and costly repairs on the assembly line.

Therefore, what is needed is a quick disconnect device that can withstand the adverse vibrational environment of feeders by having some provision that prevents the loosening of a tooling attachment to the boom and, therefore, extends the efficiency, usefulness and life of the tooling attachments and the cooperating equipment.

SUMMARY OF THE INVENTION

It is an object of the present invention to provide a quick disconnect device for quickly connecting and disconnecting tooling attachments to feeders which are used to move parts between two fixed points.

It is a further object of this invention that such quick disconnect device provide a detent for positively securing the quick disconnect device in a lock position when connecting a tooling attachment to the boom of a feeder.

In accordance with the preferred embodiment of this invention, these and other objects and advantages are accomplished as follows.

According to the prevent invention there is provided a locking quick disconnect device which is suitable for connecting and disconnecting tooling attachments to the boom of a feeder used to move parts between two fixed points. The locking quick disconnect device has a first member that mounts to the boom and a second member that mounts to the tooling attachment. The second member nests within the first member. A cam arrangement is provided through which a rod extends into the first member through an opening in the first member. The cam arrangement is operated by a lever which when rotated translates the rod between a disengaged position when the rod is retracted and disengaged with the second member, and an engaged position when the rod is extended and, therefore, engaged with the second member. The cam arrangement includes at least one cam follower and cam track combination, the cam track having a lock position which corresponds to the rod being extended and engaged with the second member, and a release position which corresponds to the rod being retracted and disengaged from the second member.

According to a preferred aspect of this invention, located at the lock position of the cam track is a detent which acts to secure the cam follower in the lock position of the cam track. The detent is a notch formed in the contour of the cam track and is sized to closely receive the cam's follower.

A significant advantage of the disclosed invention is that the detent prevents the cam follower from being dislodged from the lock position of the cam track preventing the release of the second member from the first member and, therefore, the tooling attachment from the boom.

Other objects and advantages of this invention will be better appreciated after a reading of the detailed description thereof taken in conjunction with the appended drawings.

DETAILED DESCRIPTION OF THE PREFERRED EMBODIMENT

Figure 1:
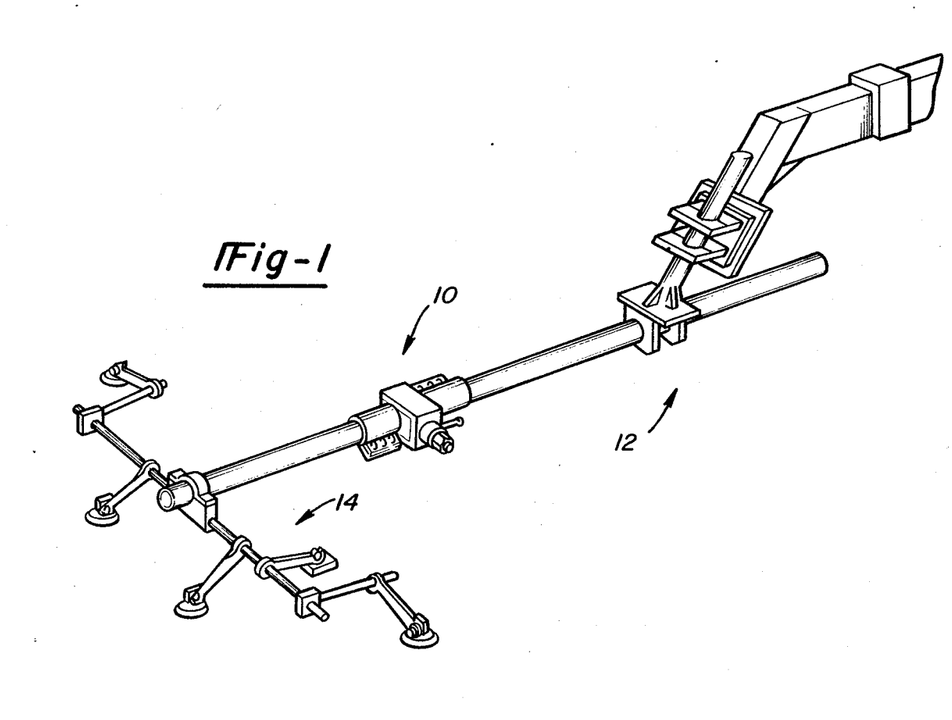
FIG. 1 shows a locking quick disconnect device mounted to a boom and connecting a tooling attachment to the boom in accordance with a preferred embodiment of this invention.

In a preferred embodiment of this invention, a locking quick disconnect device 10, as shown in FIG. 1, is mounted to a boom 12. The locking quick disconnect device 10 is shown connecting a tooling attachment 14 to the boom 12, by which the tooling attachment 14 and boom 12 are allowed to cooperate to perform pick and place operations when driven by a conventional feeder.

Figure 2:
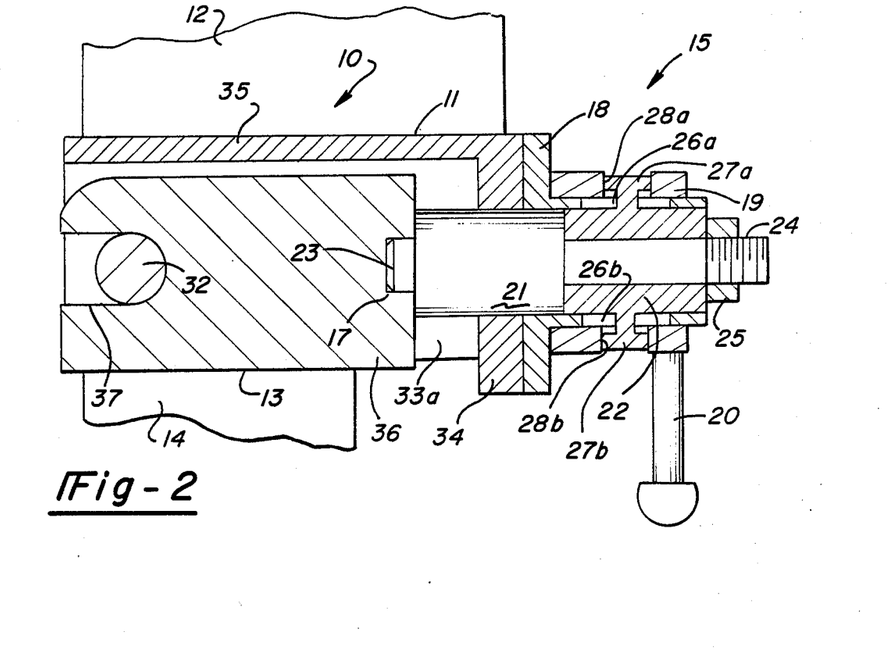
FIG. 2 is a cross-sectional side view of a locking quick disconnect device in accordance with a preferred embodiment of this invention.
Figure 3:
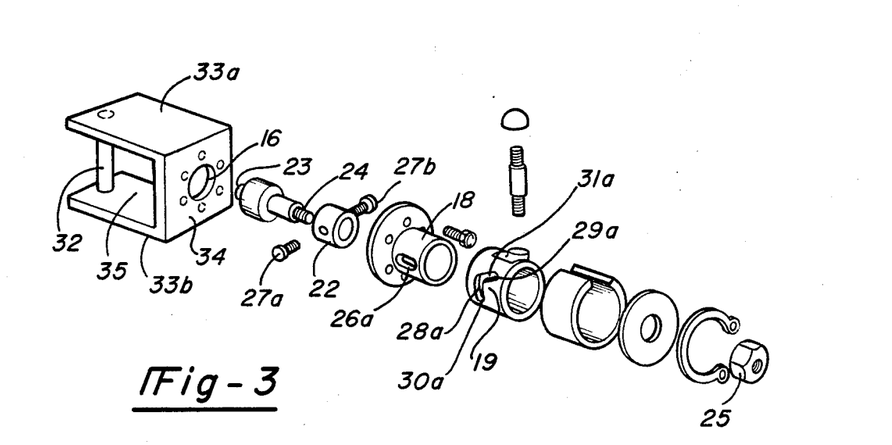
FIG. 3 is an exploded side view of the housing member and cam arrangement as shown in FIG. 2.

As shown in FIGS. 2 and 3, the preferred locking quick disconnect device 10 includes a housing member 11, a locking member 13, and a cam arrangement 15. The housing member 11 has two oppositely disposed side walls 33a and 33b, a first end wall 34, and a longitudinal wall 35. The longitudinal wall 35 is rigidly attached to the boom 12. The locking member 13 is nested in the housing member 11 and is rigidly mounted to the tooling attachment 14. The cam arrangment 15 is mounted to the first end wall 34 of the housing member 11.

An opening 16 is provided in the first end wall 34 of the housing member 11 to which the cam arrangment 15 is mounted. Adjacent to an oppositely disposed second end of the housing member 11 is a transverse member 32 which extends between and connects the side walls 33a and 33b. An aperture 17 is provided in an apertured end 36 of the locking member 13 adjacent to the opening 16 of the housing member 11, and is substantially coaxial therewith. The locking member 13 is further provided with a receiving slot 37 in an end oppositely disposed from the apertured end 36 which is sized to receive the transverse member 32.

The cam arrangement 15 includes an annular housing member 18, an annular cam member 19, a rod member 21, a carrier sleeve 22, and lever 20. The annular housing member 18 is positioned coaxially with the opening 16 and is circumferentially enclosed by the annular cam member 19. The rod member 21 is coaxially disposed through the annular housing member 18. The carrier sleeve 22 is disposed between the rod member 21 and the annular housing member 18. The lever 20 is rigidly attached to the annular cam member 19 and is oriented substantially perpendicular to the longitudinal axis of the annular cam member 19.

An engaging end 23 of the member 21 extends through the annular housing member 18 and the opening 16 while an oppositely disposed threaded end 24 extends through the carrier sleeve 22. The threaded end 24 of the rod member 21 has a smaller diameter than the engaging end 23. The carrier sleeve 22 is a retained at one end by the differing diameters of the engaging end 23 and the threaded end 24 and at its other oppositely disposed end by a nut 25. Other conventional means for retaining the carrier sleeve 22 may also be used, such as a cotter key or a C-spring.

The annular housing member 18 has a pair of diametrically opposed slotted openings 26a and 26b that are longitudinally oriented in the housing wall. Cam followers 27a and 27b are mounted diametrically opposed on the carrier sleeve 22 and are located such that they extend through the slotted openings 26a and 26b and engage diametrically opposed cam tracks 28a and 28b in the annular cam member 19. Although two cam track and cam follower arrangements are shown and preferred because they provide for balanced loading of the rod member 21, it is apparent that only cam track and cam follower arrangement is sufficient to provide for translation of the rod member 21.

Each of the cam tracks 28a and 28b has a release position 29a and 29b and a lock position 30a and 30b. Arcuate notches or detents 31a and 31b are disposed at the lock position 30a and 30b of each cam track 28a and 28b and are sized to closely receive the cam followers 27a and 27b. The cam tracks 28a and 28b are contoured such that when the lever 20 rotates the annular cam member 19 causing the cam followers 27a and 27b to traverse the cam tracks 28a and 28b, the slotted openings 26a and 26b force the cam followers 27a and 27b to simultaneously translate in a longitudinal direction. When the cam followers 27a and 27b engage the arcuate notches 31a and 31b, the cam followers 27a and 27b are secured in their respective lock positions 30a and 30b. Engagement of the cam followers 27a and 27b with the arcuate notches 31a and 31b is promoted by the reaction force from the rod member 21 being forced against the locking member 13. The cam followers 27a and 27b will not disengage from the arcuate notches 31a and 31b without a deliberately applied external force being exerted upon the cam followers 27a and 27b through the lever 20.

Because the cam followers 27a and 27b are mounted to the carrier sleeve 22, the carrier sleeve 22 is also translated in a longitudinal direction. Further, since the carrier sleeve 22 is coupled with the rod member 21, the rod member 21 also translates in a longitudinal direction.

Figure 4:
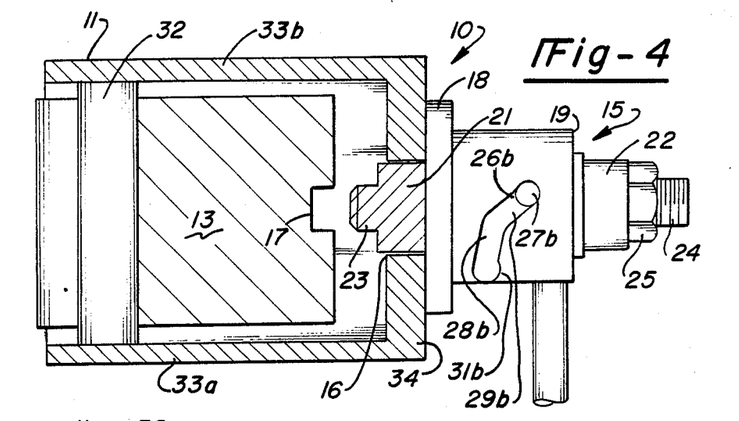
FIG. 4 is a partial cross-sectional side view of a locking quick disconnect device in a release position in accordance with a preferred embodiment of this invention.

As shown in FIG. 4, when the cam followers 27a and 27b are in the release positions 29a and 29b of the cam tracks 28a and 28b, the rod member 21 is retracted. The translational motion of the cam followers 27a and 27b retracts the rod member 21 to disengage from the aperture 17. When the rod member 21 disengages from the aperture 17, the tooling attachment 14 is disconnected from the boom 12 and is free to be removed and replaced with a second tooling attachment.

Figure 5:
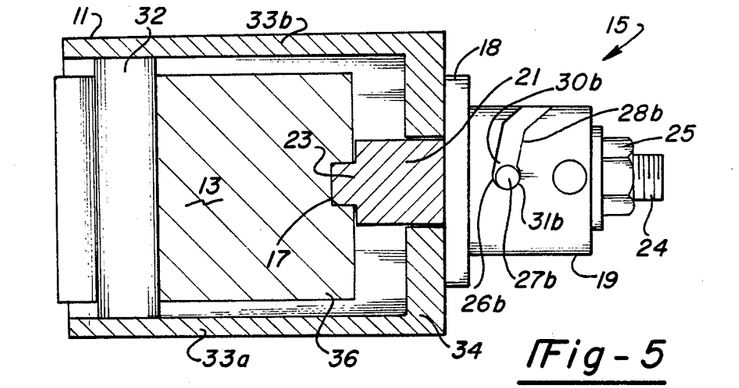
FIG. 5 is a partial cross-sectional side view of a locking quick disconnect device in a lock position in accordance with a preferred embodiment of this invention.

As shown in FIG. 5, when the cam followers 27a and 27b are in the lock positions 30a and 30b of the cam tracks 28a and 28b, the rod member 21 is extended. The translational motion of the cam followers extends the rod member to engage the aperture 17. When the rod member 21 engages the aperture, the tooling attachment 14 is securely connected to the boom 12.

Figure 6:
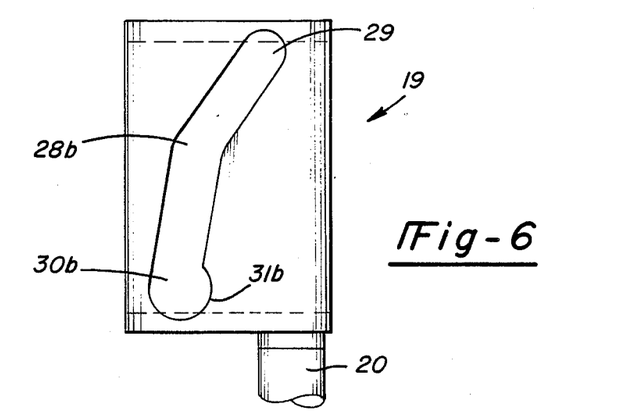
FIG. 6 is a detailed side view of a cam track in accordance with a preferred embodiment of this invention.

FIG. 6 shows the annular cam member 19 in detail. The cam track 28b having the arcuate notch 31b disposed at the lock position 30b is shown. For illustrateive purposes only, a single cam track and corresponding features have been shown.

In the preferred embodiment, a significant advantage of the locking quick disconnect device 10 is the ability of the arcuate notches or detents 31a and 31b to prevent disengagement of the cam followers 27a and 27b from the lock positions 30a and 30b without a deliberately applied force to the lever 20. Thus, the tooling attachment 14 cannot be unintentionally disconnected from the boom 12 and the integrity of the connection will withstand the vibration and motion induced upon the boom 12 by the feeder and the pick and place operation.

While the invention has been described in terms of a perferred embodiment, it is apparent that other forms could be adopted by one skilled in the art. Examples are the number of cam follower and track combinations and the rearrangement of the locking quick disconnect members with respect to the tooling attachment, boom, and each other. Accordingly, the scope of the invention is to be limited only by the following claims.

What is claimed is:

1. A locking quick disconnect device for connecting and disconnecting structural members, said locking quick disconnect device comprising:
   a first structural member;

a second structural member located in proximity to said first structural member; including a cam member rotatable relative to said first structural member cam means mounted to said first structural member, said cam member having at least one cam track, said at least one cam track having a lock position and a release position;

a slidable rod mounted adjacent said cam member, said slidable rod being operatively associated with said cam member;

lever means mounted to said cam member, said lever means operatively associated with said member; and a detent located at said lock position of said at least one cam track, said detent locking said cam member in said lock position;

whereby said slidable rod engages said second structural member thereby connecting said first structural member with said second structural member when said lever means acts to traverse said cam member from said release position to said lock position, said cam member being locked in said lock position by said detent, and said slidable rod disengages said second structural member thereby disconnecting said first structural member from said second structural member when said lever means acts to traverse said cam member from said lock position to said release position, said cam member being consequently released from said detent in said released position.

2. A locking quick disconnect device as recited in claim 1, wherein said detent located at said lock position of said at least one cam track is an arcuate notch.

3. A locking quick disconnect device as recited in claim 1, wherein said lock position is located at one end of said at least one cam track and said release position is located at an oppositely disposed end of said at least one cam track.

4. A locking quick disconnect device as recited in claim 1, wherein there are two of said at least one cam track, each of said two tracks having said detent located at said lock position.

5. A locking quick disconnect device for connecting and disconnecting structural members, said locking quick disconnect device comprising:

a first structural member;

a second structural member located in proximity to said first structural member, said second structural member having a coupling end;

an aperture in said coupling end of said second structural member;

an annular housing member mounted to said first structural member, said annular housing member being coupled with said coupling end of said second structural member;

cam means rotatably mounted to said annular housing member, said cam means having at least one cam track, said at least one cam track having a lock position located at one end of said at least one cam track and a release position located at an oppositely disposed end of said at least one cam track;

lever means rotatably mounted to said cam means, said lever means acting upon said cam means to traverse said cam means between said lock position and said release position;

a slidable rod disposed within said cam means, said slidable rod being operatively associated with said cam means, said slidable rod extending into said annular housing member; and a detent located at said lock position of said cam means, said detent locking said cam means in said lock position;

whereby said slidable rod engages said aperture thereby connecting said first structural member with said second structural member when said lever means acts to traverse said cam means from said release position to said lock position, said cam means being locked by said detent at said lock position, and said slidable rod disengages said aperture thereby disconnecting said first structural member from said second structural member when said lever means traverses said cam means from said lock position into said release position, said cam means being released from said detent.

6. A locking quick disconnect device as recited in claim 5, wherein said detent located at said lock position of said at least one cam track is an arcuate notch.

7. A locking quick disconnect device as recited in claim 5, wherein there are two of said at least one cam track, each of said two cam tracks having said detent located at said lock position.

8. A locking quick disconnect device for engaging and disengaging an attachment to the boom of an electromechanical device for moving parts between two fixed points, said locking quick disconnect device comprising:

a housing member mounted to said boom, said housing member comprising a pair of oppositely disposed side walls, a transverse member extending between and connecting said pair of oppositely disposed side walls, a longitudinal wall, a first end wall and an oppositely disposed second end, sid housing member being attached to said boom at said longitudinal wall;

an opening disposed in said first end wall of said housing member;

a locking member mounted to said attachment, said locking member being nested in said housing member, said locking member having a first end and an oppositely disposed second end, said first end and said second end of said locking member corresponding to said first end wall and said oppositely disposed second end of said housing member, respectively, said oppositely disposed second end having a receiving slot receiving said transverse member;

an aperture in said first end of said locking member, said aperture being substantially coaxial with said opening of said housing member;

an annular housing member mounted to said first end wall of said housing member at a mounting end of said annular housing member said annular housing member having an oppositely disposed distal end to said mounting end, said annular housing member being substantially coaxial with said opening of said housing member and said aperture of said locking member, said annular housing member having at least one longitudinally oriented slot;

an annular cam member circumjacent said annular housing member, said annular cam member having an outer surface;

at least one cam track disposed in said outer surface of said annular cam member, said at least one cam track having a release position at one end of said at least one cam track and a lock position located at an oppositely disposed end of said at least one cam track;

an arcuate notch located at said lock position of said at least one cam track;

a rotatable lever attached to said annular cam member, said rotatable lever having an axis of rotation substantially coaxial with said annular housing member;

a slidable rod member coaxially disposed within said annular housing member, said slidable rod member having an engaging end, said engaging end being adjacent said mounting end of said annular housing member and projecting through said opening of said housing member, said slidable rod further having an oppositely disposed threaded end, said threaded end projecting through said distal end of said annular housing member, said threaded end having a smaller diameter than said engaging end;

a carrier sleeve coaxially disposed within said annular housing member, said carrier sleeve being disposed adjacent said threaded end of said slidable rod member and said distal end of said annular housing member; and at least one cam roller having one end mounted to said carrier sleeve, said at least one cam roller having an opposite end extending through said at least one longitudinally oriented slot of said annular housing member and engaging said at least one cam track of said annular cam member;

whereby said engaging end of said slidable rod engages said aperture of said locking member thereby connecting said attachment to said boom when said rotatable lever is rotated around said axis of rotation of said rotatable lever such that said at least one cam roller traverses said at least one cam track from said release position to said oppositely disposed lock position, said at least one cam roller engaging said arcuate notch which acts to lock said slidable rod while engaged with said aperture, and said engaging end of said slidable rod disengages said aperture of said locking member thereby disconnecting said attachment from said boom when said rotatable lever is oppositely rotated around said axis of rotation of said rotatable lever such that said at least one cam roller traverses said at least one cam track from said oppositely disposed lock position to said release position and said at least one cam roller disengages from said arcuate notch.

9. A locking quick disconnect device as recited in claim 8, wherein said at least one cam track, said at least one cam roller, and said arcuate notch comprise two cam tracks, two cam rollers and two arcuate notches.

* * * * *

UNITED STATES PATENT AND TRADEMARK OFFICE
CERTIFICATE OF CORRECTION

PATENT NO. : 4,943,181

DATED : July 24, 1990

INVENTOR(S) : Patrick M. Murphy

It is certified that error appears in the above-identified patent and that said Letters Patent is hereby corrected as shown below:

Column 1, line 11, delete "press" and insert ---- presses ----.

Column 1, line 13, delete "secure" and insert ---- secures ----.

Column 1, line 31, delete "interchangability" and insert ---- interchangeability ----.

Column 3, line 17, delete "arrangment" and insert ---- arrangement ----.

Column 3, line 40, after "the" insert ---- rod ----.

Column 3, line 45, delete "a".

Column 3, line 61, after "only" insert ---- one ----.

Column 4, line 43, delete "illustrateive" and insert ---- illustrative ----.

Column 4, line 57, delete "perferred" and insert ---- preferred ----.

UNITED STATES PATENT AND TRADEMARK OFFICE
CERTIFICATE OF CORRECTION

PATENT NO. : 4,943,181
DATED : July 24, 1990
INVENTOR(S) : Patrick M. Murphy

It is certified that error appears in the above-identified patent and that said Letters Patent is hereby corrected as shown below:

Column 5, line 2, delete "including a cam mem-"

Column 5, line 3, delete in its entirety.

Column 5, line 4, delete "ber".

Column 5, line 5, delete "member" (second occurrence) and insert ---- means including a cam member rotatable relative to said first structural member ----.

Column 5, line 12, after "said" insert ---- cam ----.

Column 5, line 42, after "two" insert ---- cam ----.

Column 5, line 50, delete "couplng" and insert ---- coupling ----.

Column 6, line 35, delete "sid" and insert ---- said ----.

UNITED STATES PATENT AND TRADEMARK OFFICE
CERTIFICATE OF CORRECTION

PATENT NO. : 4,943,181

DATED : July 24, 1990

INVENTOR(S) : Patrick M. Murphy

It is certified that error appears in the above-identified patent and that said Letters Patent is hereby corrected as shown below:

Column 6, line 55, after "housing" insert a comma ---- , ----.

Signed and Sealed this

Fifth Day of May, 1992

Attest:

*Attesting Officer*

DOUGLAS B. COMER

*Acting Commissioner of Patents and Trademarks*